United States Patent [19]

LaBair

[11] Patent Number: 4,909,130

[45] **Date of Patent: * Mar. 20, 1990**

[54] CYLINDER END CAP

[75] Inventor: Richard L. LaBair, Wixom, Mich.

[73] Assignee: Peninsular, Inc., Roseville, Mich.

[ * ] Notice: The portion of the term of this patent subsequent to May 9, 2006 has been disclaimed.

[21] Appl. No.: 341,427

[22] Filed: Apr. 21, 1989

Related U.S. Application Data

[63] Continuation of Ser. No. 192,229, May 10, 1988, Pat. No. 4,827,835, which is a continuation-in-part of Ser. No. 155,212, Feb. 12, 1988, abandoned, which is a continuation of Ser. No. 861,860, Apr. 28, 1986, Pat. No. 4,726,282.

[51] Int. Cl.[4] .............................................. B23Q 3/00

[52] U.S. Cl. ....................................... 92/128; 92/161; 92/169.2

[58] Field of Search ............. 92/128, 161, 169, 169.2, 92/171

[56] References Cited

U.S. PATENT DOCUMENTS 2,569,734 10/1951 Saalfrank .
2,854,952 10/1958 Wilson .
3,688,646 9/1972 Flick .
3,738,232 6/1973 Kado .
3,913,883 10/1975 Irwin .
4,021,027 5/1977 Blatt .
4,373,426 2/1983 Weyer .
4,458,889 7/1984 McPherson et al. .
4,726,282 2/1988 LaBair .

OTHER PUBLICATIONS

Five (5) pages of Penninsular, Inc. drawings.
Twenty—four (24) pages of DE—STA—CO drawings, 1985.
Fisher A—style AP Model Cylinder (5 sheets); at least as early as 1977.
Stellhorn Catalog (1982), p. 104, Air—Hydraulic Cylinders.
Lincoln Controls Hydraulic/Pneumatic Systems Catalog (1982).
ISI Manufacturing, Inc. Brochure entitled "Power and Manual Industrial Clamps".
Bellows—Valvair Brochure (1966), front page "Air Motor".

*Primary Examiner*—John Fox
*Attorney, Agent, or Firm*—Harness, Dickey & Pierce

[57] ABSTRACT

An end cap for a reciprocating piston rod cylinder is designed so that the cylinder can be easily removed from external structures, such as a power clamp, without loosening the tie rods.

6 Claims, 2 Drawing Sheets

CYLINDER END CAP

This is a continuation of U.S. patent application Ser. No. 07/192,229, filed May 10, 1988, now Pat. No. 4,827,835 which is a continuation-in-part application of U.S. Ser. No. 155,212, now abandoned filed Feb. 12, 1988, which is a continuation application of U.S. Ser. No. 861,860 filed Apr. 28, 1986, now U.S. Pat. No. 4,726,282.

BACKGROUND

1. Technical Field

This invention relates to cylinders such as air or pneumatic cylinders, with a reciprocating piston rod therein and, more particularly, to the way in which such cylinders are mounted.

2. Background

Air or pneumatic cylinders are used in a wide variety of applications. One such application is shown in FIG. 1 in which an air cylinder 10 is shown mounted to a power clamp 14. Some examples of known power clamps are disclosed in U.S. Pat. Nos. 4,021,027 to Blatt and 4,458,889 to McPherson et al., together with trade literature such as the ISI Manufacturing, Inc. brochure entitled "Power and Manuel Industrial Clamps". The cylinder is characterized by a reciprocating piston (not shown) which is slideably mounted within a sleeve 16. Suitable fluid, such as air, is applied through ports 18 and 20 in end caps 22 and 24, respectively, to cause reciprocating movement of the piston in a manner well known in the art. The cylinder 10 is typically mounted to the power clamp 14 by way of a plurality of tie rods 26 which extend through the end caps 22 and 24 and are threaded into mounting holes 28 in the clamp 14. The cylinder housing components are urged together under compression by rotating heads 30 on the outer end of tie rods 26 to screw their opposite threaded ends into the tapped holes 28.

If it ever becomes necessary to remove the cylinder 10 from the power clamp 14, the tie rods 26 are backed out of the threaded holes 28 in the clamp by suitably counter-rotating the heads 30. After the tie rod ends have been disengaged from their respective mounting holes 28, the compressive force that held all of the cylinder housing components together is no longer provided. Consequently, it is possible for the end cap 20 to actually slide off of the ends of the tie rods 26. Even if this does not happen, it would be desirable to avoid the loose connection of the cylinder housing components when it is removed from the power clamp. Such removal may be needed for replacement of the cylinder or the like.

SUMMARY OF THE INVENTION

An end cap is provided for a cylinder of the type having a pair of end caps held together by a plurality of tie rods extending on the outside of a sleeve in which a reciprocating piston is housed. The cap includes an inner portion to which the tie rods are attached. An outer plate portion of the end cap has a plurality of mounting openings therein. The outer plate portion is spaced a sufficient distance from the inner portion to permit fastening devices extending through the openings in the outer plate to be removed or sufficiently loosened to separate the cylinder from external structure, such as a power clamp, without needing to disengage the tie rods from the inner portion of the end cap. As a result, the cylinder housing components remain secure.

BRIEF DESCRIPTION OF THE DRAWINGS

The various advantages and other features of this invention will become apparent to those skilled in the art upon reading the following specification and by reference to the drawings in which.

DESCRIPTION OF THE PREFERRED EMBODIMENT

Figure 1:
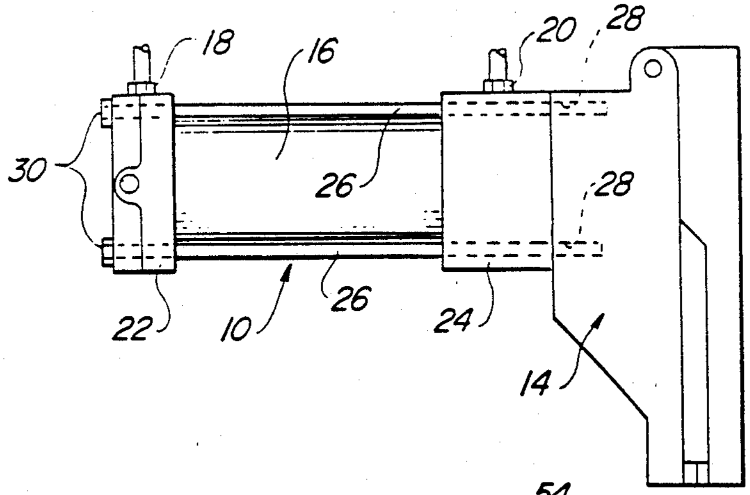
FIG-1 PRIOR ART
FIG. 1 is a side view of an air cylinder mounted to a power clamp according to the teachings of the PRIOR ART.
Figure 2:
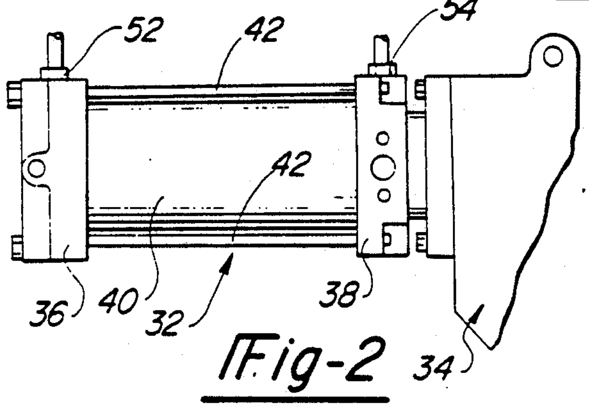
FIG. 2 is a view similar to FIG. 1 illustrating the mounting according to the teachings of the present invention.
Figure 3:
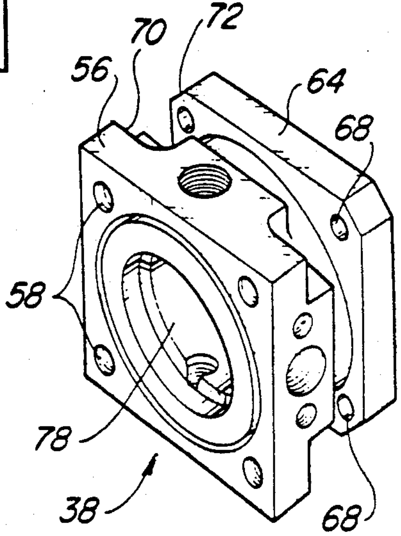
FIG. 3 is a perspective view of an end cap made in accordance with the preferred embodiment of this invention.

The present invention will be described in connection with a few specific examples. For example, the embodiment of FIGS. 2–6 is specifically concerned with mounting an air cylinder 32 to a power clamp 34. While the present invention can be used with a variety of different cylinder and clamp designs, a suitable and presently preferred design for the cylinder is disclosed in U.S. Pat. No. 4,726,282 and for the power clamp is disclosed in concurrently filed patent application U.S. Ser. No. 192329 entitled "Power Clamp" by McNamara et al., both of which are commonly assigned to the assignee of the present invention and both of which are incorporated by reference herein.

With reference then to FIGS. 2–6, the cylinder 32 includes two end caps 36 and 38 on opposite sides of a sleeve 40, all of which are held together by a plurality of tie rods 42. The present invention primarily concerns the construction of end cap 38 and, consequently, it will be described in detail later herein. A reciprocating piston rod 44 is slideably mounted within sleeve 40. One end of rod 44 includes a piston head 46 with suitable seals 48, 50 thereon. Air introduced through ports 52, 54 thus serves to shuttle the piston 44 rod back and forth depending upon which port receives the compressed air in a manner known in the art.

Figure 5:
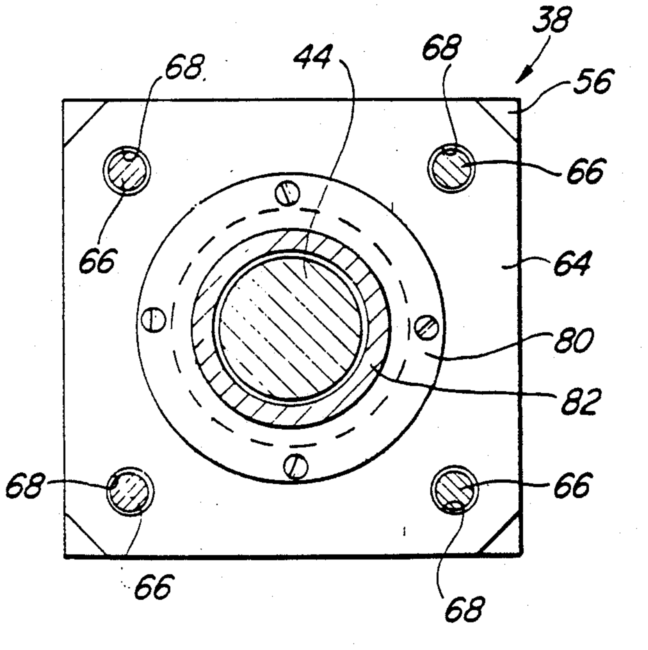
FIG. 5 is a cross-sectional view taken along the lines 5—5 of FIG. 4.

Focusing attention on end cap 38, its shape conforms to National Fluid Power Association (NFPA) standards, as does the rest of cylinder 32. As viewed from the end as shown in FIG. 5, end cap 38 has a substantially square end profile which, in this specific embodiment, is about 3 ¾ inch square. Cap 38 is preferably made of one piece of metal such as an investment casted member made of 4140 steel. The cap 38 includes an inner portion 56 to which the tie rods 42 are attached. In this example, four equally spaced, threaded tie rod mounting holes 58 are provided at each corner of the generally square inner portion 56. The tie rods 42 are in the form of elongated threaded studs having threaded ends which mate with the threads in tie rod mounting holes 58. During assembly of the cylinder the tie rods 42 are passed through clearance holes 63 in end cap 36 and then screwed into mounting holes 58 in the inner portion 56 of end cap 38. The opposite tie rod ends are secured by nuts 62 which urge the cylinder assembly together.

End cap 38 further includes provision for enabling the cylinder 34 to be connected to external structure without requiring the tie rods 42 to be disengaged with the inner portion of the end cap 38. To this end, an outer plate portion 64 is provided that is spaced a sufficient distance from the inner portion 56 to permit fastening devices 66 extending through holes 68 in the outer plate portion 64 to be removed or sufficiently loosened to separate the cylinder without needing to disengage the tie rods 42 from the inner portion 56 of the end cap 38. In this specific embodiment, there is a relief of about 1 ¼ inch between mutually opposing faces 70 and 72. This relief measurement extends axially of piston rod 44 and can be varied as desired depending upon the length of the fasteners used to connect the cylinder to external structures. A sufficient radially extending relief provides clearance for the fasteners and whatever instrument (such as a wrench or the like) that is necessary to tighten and loosen the fasteners.

The tie rod holes 58 and mounting holes 68 are preferably concentric. In such manner, a clamp manufacturer using a standard cylinder with a standard hole pattern can interchange the cylinder of the present invention.

End cap 38 includes an axially extending bore 76 therethrough through which an end of the piston rod projects. A retaining ring 80 holds a bushing 82 in the bore 76. A seal 84 on the interior surface of bushing 82 is used to seal air from the interior of the cylinder. A sintered bronze grease bearing 86 has grease packed between its two flanges which is used to lubricate the piston rod. Mounted interiorly adjacent to the grease bearing 86 are a pair of additional sealing members 88 and 90. Moving inwardly still, a cushion seal 94 is used to contact the hub of the piston head as it enters into the end cap 38.

Figure 6:
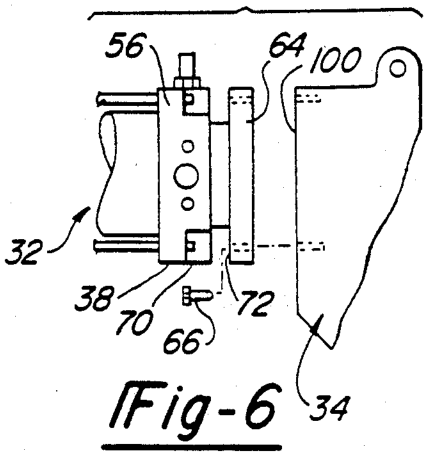
FIG. 6 is a partial side view illustrating the cylinder disconnected from the power clamp.

As perhaps best shown in FIG. 6, the cylinder 32 remains a self-containing unit with no loose parts even after it has been removed from the power clamp 34. This is because, unlike the prior art designs, the tie rods 42 remain fixed to the inner portion 56 of end cap 38. Consequently, the previous problems of loose parts have been eliminated by way of this invention. As described in more detail in connection with the above-referenced copending application to McNamara et al., the outer end 96 of piston rod 44 is threaded into a coupling member 98 which, in turn, connects the piston rod 44 to internal linkage in the power clamp which converts the reciprocal movement of the piston rod into clamp arm movement. The combination of the end cap 38 and coupling design enables very easy replacement of the air cylinder if this course of action should become necessary. All that need be done is for the user to loosen the fasteners 66 and then pull the air cylinder 32 away from the clamp until the coupler 98 extends out of the end wall 100 of the power clamp 34 where the piston rod end 96 can easily be unscrewed and removed from the coupler 98. By reversing the procedure a new cylinder can be remounted.

Figures 4, 7, 8, 9:
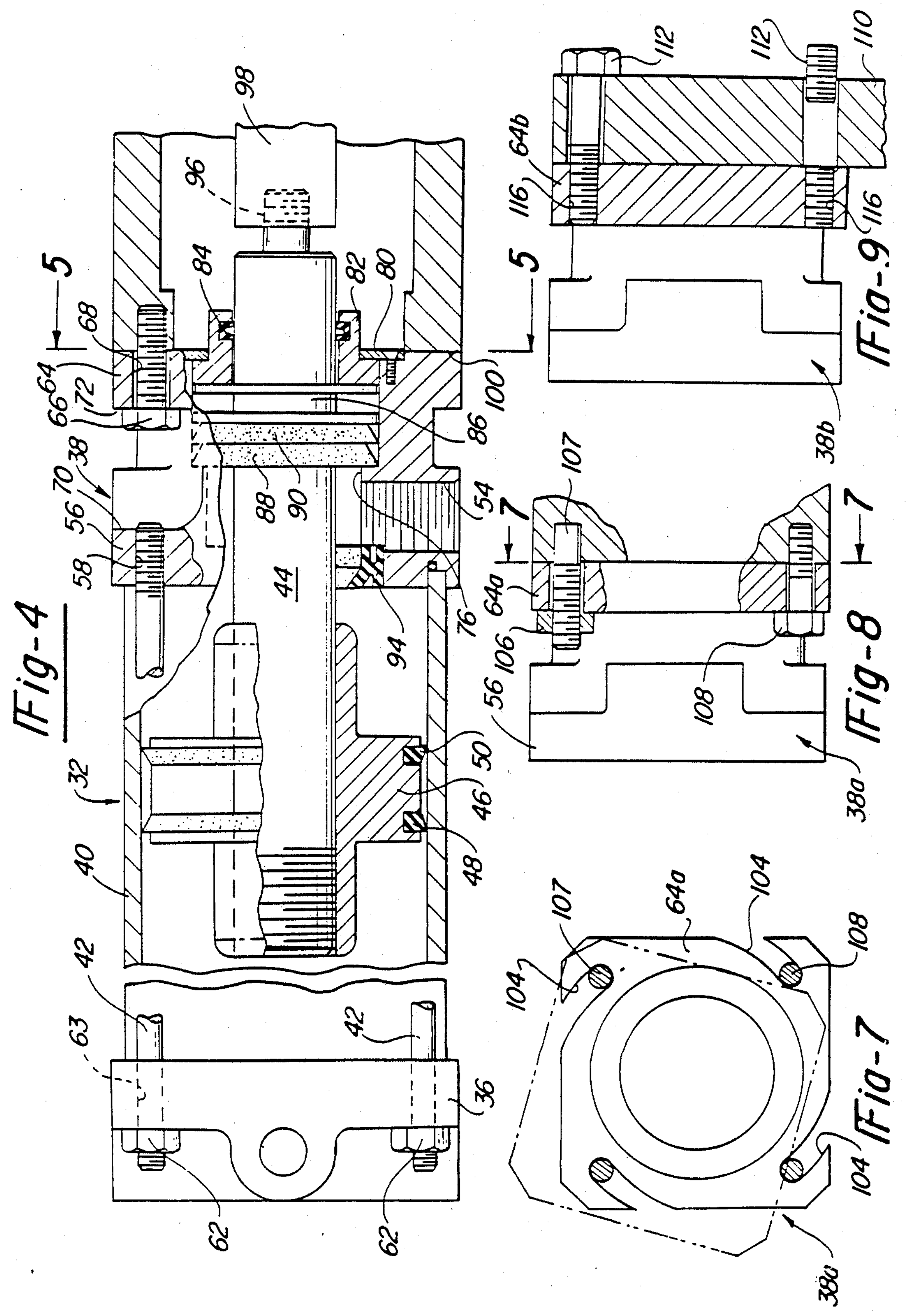
FIG. 4 is a partial cross-sectional view of the cylinder-power clamp mounting shown in FIG. 2.
FIG. 7 is an end view of the outer plate portion of an alternative end cap design as viewed along the lines 7—7 of FIG. 8.
FIG. 8 is a partial cross-sectional view of the alternative embodiment of FIG. 7.
FIG. 9 is a view similar to FIG. 8 but showing still another embodiment.

FIGS. 7–9 provide alternative mounting schemes for the end cap. In FIGS. 7 and 8, the external mounting in plate openings **64*a* of end cap 38*a* are in the form of arcuate slots 104 instead of clearance holes 68. In this design, the nuts 106 or studs 107 or heads of bolts 108 need only be slightly loosened to permit the air cylinder to be twisted out of engagement with the clamp 34. It should also be understood that the end caps can be used to mount the air cylinder to a wide variety of external structures, not merely to a power clamp. This is illustrated in FIG. 9 wherein external structure in the form of member 110 is fixed to the outer plate 64*b* of end cap 38*b* by way of bolts 112 that mate with threaded holes 116 in the end cap 38*b***. This type of mounting is sometimes known in the trade as an extended tie rod mounting.

It should be understood that while this invention has been described in connection with a few examples that various modifications will become apparent to those skilled in the art after having the benefit of studying the specification, drawings and following claims.

What is claimed is:

1. A method of assembling and disassembling a cylinder to a power clamp, said method comprising the steps of:

(a) providing first and second end caps, said first end cap including an outer portion having a plurality of mounting openings therein, said first end cap further including a inner portion being arranged with said outer portion to provide clearance for fasteners in the mounting openings, said inner portion having a plurality of tie rod holes therein;

(b) attaching the first and second end caps to opposite ends of a sleeve having a reciprocating piston rod therein by engaging one end of the tie rods to the second end cap by securing the other end of the tie rods to the first end cap by engaging them in said tie rod holes in the inner portion of the first end cap;

(c) connecting the piston rod in the cylinder to a member in the power clamp;

(d) extending fasteners through the mounting openings in the outer portion of the first end cap into an end portion of the power clamp to thereby attach the cylinder to the power clamp; and (e) thereafter, loosening the fasteners when it is desired to disengage the cylinder from the power clamp, whereby disassembly can be accomplished without requiring that the tie rods be separated from the end caps.

2. The method of claim 1 wherein the first end cap is an integral block of metal having a substantially square inner portion and a substantially square outer portion, wherein said mounting openings are located at the corners of the outer portion and said tie rod holes are located at the corners of the inner portion.

3. The method of claim 1 wherein said outer portion is spaced from said inner portion by a relief providing said clearance for said fasteners.

4. A cylinder for connection to a power clamp having an end portion with an opening therein, the cylinder comprising:

(a) a pair of end caps on opposite sides of a housing sleeve in which a reciprocating piston rod is mounted;

(b) a plurality of tie rods connected to the end caps;

(c) one end cap adjacent to the power clamp having an outer portion with a plurality of mounting openings therein; and (d) said one end cap further including an inner portion having a plurality of tie rod holes for receiving ends of the tie rods, said inner portion and outer portion being arranged to provide clearance for fasteners in the mounting openings to removably attach the cylinder to the power clamp without needing to loosen the tie rods, whereby the cylinder can be easily disengaged from the clamp.

5. The cylinder of claim 4 wherein said one end cap is an integral block of metal having a substantially square inner portion and a substantially square outer portion, and wherein the tie rod holes and mounting openings are located at the corners of said inner and outer portions.

6. The cylinder of claim 4 wherein said outer portion is spaced from said inner portion by a relief providing clearance for said fasteners.

* * * * *